United States Patent
Satoh

(10) Patent No.: US 8,036,587 B2
(45) Date of Patent: Oct. 11, 2011

(54) IMAGE FORMING APPARATUS

(75) Inventor: Masaki Satoh, Osaka (JP)

(73) Assignee: Kyocera Mita Corporation, Osaka (JP)

(*) Notice: Subject to any disclaimer, the term of this patent is extended or adjusted under 35 U.S.C. 154(b) by 425 days.

(21) Appl. No.: 12/379,534

(22) Filed: Feb. 24, 2009

(65) Prior Publication Data

US 2009/0219706 A1   Sep. 3, 2009

(30) Foreign Application Priority Data

Feb. 29, 2008   (JP) ................................ 2008-049740

(51) Int. Cl.
G03G 15/00   (2006.01)
(52) U.S. Cl. ........................................ 399/380; 399/189
(58) Field of Classification Search .................. 361/755, 361/800; 399/177, 189
See application file for complete search history.

(56) References Cited

U.S. PATENT DOCUMENTS

| | | | | |
|---|---|---|---|---|
| 6,510,301 B2 * | 1/2003 | Tanaka | | 399/125 |
| 7,046,941 B2 * | 5/2006 | Kameyama et al. | | 399/107 |
| 7,239,825 B2 * | 7/2007 | Ohama et al. | | 399/107 |
| 7,369,792 B2 * | 5/2008 | Shiraki | | 399/113 |
| 7,660,548 B2 * | 2/2010 | Muraki et al. | | 399/107 |
| 2003/0185584 A1 * | 10/2003 | Hirose et al. | | 399/92 |
| 2004/0081479 A1 * | 4/2004 | Kobayashi et al. | | 399/80 |
| 2004/0201872 A1 * | 10/2004 | Horaguchi et al. | | 358/500 |
| 2004/0247337 A1 * | 12/2004 | Ohama et al. | | 399/107 |
| 2006/0029424 A1 * | 2/2006 | Kawai et al. | | 399/125 |
| 2008/0145098 A1 * | 6/2008 | Ito | | 399/114 |
| 2008/0175620 A1 * | 7/2008 | Ohta et al. | | 399/125 |
| 2009/0010697 A1 * | 1/2009 | Nishimura et al. | | 399/405 |
| 2011/0103812 A1 * | 5/2011 | Takasaka et al. | | 399/44 |
| 2011/0110682 A1 * | 5/2011 | Yoshimura et al. | | 399/110 |

FOREIGN PATENT DOCUMENTS

JP   3578109   7/2004

* cited by examiner

*Primary Examiner* — Lisa Lea Edmonds
*Assistant Examiner* — Xanthia C Cunningham
(74) *Attorney, Agent, or Firm* — Smith, Gambrell & Russell, LLP

(57) ABSTRACT

An image forming apparatus 10 includes: a body frame 11 including an image forming section 60; and an image reading section 40, as an upper member openably mounted on top of the body frame, that is provided with a document stage on which a document is loaded and that reads an image of the document. The image forming apparatus further includes: first holding member 6 placing the image reading section 40 over the image forming section and holding it in a closed state; and second holding member 1 holding the image reading section rotatably relative to the image forming section and having a guide shaft and guide slots that are in a disengaged state when the image reading section is in the closed state and that engage with each other so as to function as a hinge when the image reading section is rotated from the closed state to the open state, relative to the image forming section.

13 Claims, 4 Drawing Sheets

IMAGE FORMING APPARATUS

This application is based on Japanese Patent Application No. 2008-049740 filed on Feb. 29, 2008, the contents of which are hereby incorporated by reference.

BACKGROUND OF THE INVENTION

1. Field of the Invention

The present invention relates to an image forming apparatus including an image reading section that reads a document image and an image forming section that records that document image on a sheet of paper.

2. Description of Related Art

Conventionally known is an image forming apparatus that reads an image of a document loaded on a platen or delivered through a paper conveying section, and records that image onto a sheet of paper or communicates it in the form of an image signal. One example of such an image forming apparatus is shown in FIG. 4. As shown in this figure, an image forming apparatus 10A includes: a body frame 11; a paper feeding section 50, an image forming section 60, and a fixing section 70 that are provided inside the body frame 11; an image reading section 40, a platen 12 formed of transparent glass, and a document conveying section 20 that are provided on top of the body frame 11. Inside the body frame 11, in an upper portion thereof, is provided a controller 13 that controls document conveyance operation, reading operation, image forming operation, and other operation, and in a middle portion thereof, is provided a paper ejecting section 80 equipped with an ejected paper tray 82.

The document conveying section 20 is openably mounted on the body frame 11 with a hinge section 20a provided on the far side of the plane of the figure. The document conveying section 20 includes: a document loading tray 21; a document feeding section 30; a document conveying path 27; and a document cover 29.

In the document loading tray 21, a pair of document guides 22 are so provided as to be slidable in the direction orthogonal to the document conveyance direction of the document loading tray 21; thus, a loaded document can be held in place corresponding to the size thereof on the tray without being displaced laterally. The ejected document tray 29a is formed integrally with the document cover 29 as part of the top face thereof. Thus, the document loading tray 21 forms the upstream-side end of the document conveying path 27, and the ejected document tray 29a forms the downstream-side end of the document conveying path 27. On the ejected document tray 29a, there are provided document displacement prevention members 28 composed of, for example, one 28a for A3 size, one 28b for A4 size, and one 28c for A5 size.

In the document feeding section 30, there are provided in order from the upstream side of the document conveyance direction along the document conveying path 27 a first document feeding roller 31, a second document feeding roller 32, a separation roller 33, a pair of first document conveying rollers, a pair of registration rollers 35, a pair of second document conveying rollers 36, a document guide 37, a pair of third document conveying rollers 38, and a pair of ejecting rollers 39. A document reading position 12a is set at a position facing the document guide 37 on the top face of the platen 12.

The first feeding roller 31 is so provided as to be movable up and down by unillustrated driving member such as a solenoid. When no document C is on the document loading tray 21, the feeding roller 31 is moved upward by the driving section based on a signal that is sent from a loaded document detecting member 21a, such as an optical reflection type sensor, provided on the document loading tray 21, to the controller 13. When a document C is loaded, the first feeding roller 31 is moved downward by the driving section and by its own weight so as to come into contact with the document C.

According to a stationary document reading method, a document (not illustrated) is loaded on a stationary document reading position 12b that is set on the top face of the platen 12, and is pressed by the document cover 29; thus, the document on the side having contact with the platen 12 is read by the image reading section 40.

The image reading section 40 includes: an exposure lamp 41; a reflecting plate 42; a first mirror 43; a second mirror 44; a third mirror 45; a collecting lens 46; and an image sensor 47 (e.g., line-type CCD). The exposure lamp 41 and the first mirror 43 are mounted on a carriage 48 and are made movable in the left/right directions in the figure.

The paper feeding section 50 includes a paper feeding cassette 51 and a paper feeding roller 52 provided in a lowest portion of the body frame 11. The paper feeding cassette 51 is for accommodating sheets of paper P. The sheets of paper P are fed out one after another into the conveying path 55 by the feeding roller 52 and are conveyed to the image forming section 60 by the pair of conveying rollers 53 and the pair of registration rollers 54.

The image forming section 60 includes: a photoconductive drum 61; an electrostatic charger 62 arranged near it; an optical scanning unit 63; a developing unit 64; a transfer roller 65; and a cleaner 66. The photoconductive drum 61 rotates in the clockwise direction in FIG. 4, so that first its surface is electrically charged uniformly by the electrostatic charger 62. Next, based on an electrical signal of the image that is read at the image reading section 40 and is sent through the controller 13, a laser beam is emitted from the optical scanning unit 63 onto the surface of the photoconductive drum 61, and consequently, on the paper P, a latent image is formed. The latent image is then supplied with toner and is developed as a toner image by the developing unit 64.

The sheet of paper P having the toner image transferred thereon is conveyed to the fixing section 70 composed of a heating roller 71 and a pressing roller 72, and the toner image is so heated and pressed as to be fixed onto the sheet of paper P there. Thereafter, the sheet of paper P is ejected by a pair of ejecting rollers 81 to the paper ejecting section 80 equipped with the ejected paper tray 82 with the surface of the paper having the image formed thereon facing that tray.

In the conventional image forming apparatus including the image reading section and the image forming section as described above, the image reading section needs to be mounted in a precise position relative to the image forming section fixedly housed inside the body frame. To increase the ease of maintenance of such apparatuses, there have been proposed some in which the image reading section is made openable with respect to the image forming section. For example, as disclosed in a patent publication (JP-B-3578109), by rotatably coupling together upper and lower units via a hinge member, it is possible to obtain an openable structure.

With this structure, for example, the image reading section disposed on the upper side is openable with respect to the image forming section disposed on the lower side, and this facilitates maintenance, replacement, and other work related to components inside the body frame and the apparatus itself.

However, if the rotatable part, namely the image reading section, is large and heavy, it cannot easily be placed at a precise position via the hinge member. Moreover, another problem will arise that the repeated opening and closing of the image reading section result in a change in the relative positional relationship with the image forming section.

Accordingly, there is a demand for a coupling structure in which upper and lower members are rotatably coupled with each other, and by which the upper, rotatable member is easily positioned even though it is heavy, and repeated opening and closing of the upper member does not lead to any change in the coupled posture or in the positions of the upper and lower members relative to each other.

SUMMARY OF THE INVENTION

In light of the above-described problems, it is an object of the present invention to provide an image forming apparatus in which an image reading section requiring precise positioning relative to the apparatus body is, with a simple structure, mounted openably with respect to a body frame, and positioning of the image reading section when it is placed is facilitated, so that even though the image reading section is opened and closed repeatedly, no change occurs in the relative position of the image reading section.

To achieve the above object, according to the present invention, an image forming apparatus includes: a body frame; an image forming section provided in the body frame; an image reading section for reading a document loaded on a document stage; a first holding member attached on the body frame, for mounting and holding the image reading section on the body frame in a closed state; and a second holding member attached on the body frame, for holding the image reading section rotatably relative to the body frame in an open state; wherein the second holding member includes a guide shaft and a guide slot, the guide shaft and the guide slot being in a disengaged state when the image reading section is in the closed state, the guide shaft and the guide slot being in a state engaged with each other so as to function as a hinge when the image reading section is rotated, from the closed state to the open state, relative to the body frame.

With this structure, even though the image reading section is mounted on the image forming section via two holding members, namely the first and second holding members, when the image reading section is in the closed state in which the image reading section is fixed on the body frame, the guide shaft and the guide slots are in the disengaged state so that the second holding member is released. Accordingly, the two holding members do not interfere with each other and the image reading section is set on the image forming section via the first holding member alone. This facilitates positioning of the image reading section, making it possible to place the image reading section at a precise position. Moreover, when the image reading section is lifted up and opened, with upward rotation operation, the guide shaft and the guide slots engage with each other so as to form the second holding member. Thus, the second holding member functions as a hinge, making it possible to facilitate opening and closing of the image reading section.

Further, according to the present invention, in the image forming apparatus structured as described above, the first and second holding members are configured not to interfere with each other so that while the first holding member is enabled, the second holding member is not enabled, and while the second holding member is enabled, the first holding member is not enabled.

Further, according to the present invention, in the image forming apparatus structured as described above, the second holding member includes an upper hinge frame acting as a movable side and a lower hinge frame acting as a fixed side, the guide shaft is provided on one of the hinge frames, and the guide slot is provided in another of the hinge frames, and the guide slot is elongated-hole shaped so as to slidably hold the guide shaft and two of such guide slots are disposed at opposite ends of the guide shaft so as to face each other. With this structure, the guide shaft is put through the elongated hole-shaped guide slots so as to be slidable therein; thus, the guide shaft does not come out of the guide slots in the middle of the rotation operation, making it possible to open and close the image reading section safely.

Further, according to the present invention, in the image forming apparatus structured as described above, the guide slots are provided in the upper hinge frame, and the guide shaft is provided on the lower hinge frame. With this structure, the guide shaft is provided on the lower hinge frame on the fixed side; thus, it is possible to change the mode of rotation simply by replacing the upper hinge frame provided with the guide slots on the movable side.

Further, according to the present invention, in the image forming apparatus structured as described above, the guide slot has arc-shaped end portions and a middle slot portion, wherein one of the end portions becomes a first fulcrum portion at which the guide shaft and the guide slot engage with each other in rotation from the closed state to the open state, another of the end portions becomes a second fulcrum portion at which the guide shaft and the guide slot engage with each other when the rotation reaches a point beyond a predetermined angle, and the middle slot portion serves as a slide guide portion that guides the guide shaft to move between the first and second fulcrum portions, and the guide shaft is located in the slide guide portion to be in the disengaged state when the image reading section is in the closed state. With this structure, the guide shaft, which is in the disengaged state when the image reading section is in the closed state, makes contact with the first fulcrum portion after rotation starts, so that the second holding member functions as a hinge. The first fulcrum serves as a guide portion for rotation up to a predetermined angle, and when rotation exceeds the predetermined angle, the guide shaft moves to the second fulcrum portion, which serves as a guide portion so as to keep the image reading section rotating. Therebetween, the middle slot portion serves as a guide portion. As a result, the second holding member can function as a hinge over the entire range of the rotation operation; thus, it is possible to surely open the image reading section up to a large rotation angle.

Further, according to the present invention, in the image forming apparatus structured as described above, the guide shaft is provided on the upper hinge frame, and the guide slots are provided in the lower hinge frame. With this structure, it is possible to change the mode of rotation simply by replacing the lower hinge frame provided with the guide shaft on the fixed side.

Further, according to the present invention, in the image forming apparatus structured as described above, the guide slot has arc-shaped end portions and a middle slot portion, wherein one of the end portions becomes a fulcrum portion in the open state, and the middle slot portion serves as a slide guide portion that guides the guide shaft to move for rotation from the closed state to the open state, and the guide shaft is located in the slide guide portion to be in a disengaged state when the image reading section is in the closed state. With this structure, the guide shaft and the guide slots are in the disengaged state during the rotation operation and in the open state, so that they function as a hinge over the entire range of rotation operation. Thus, it is possible to open and close the image reading section safely.

Further, according to the present invention, in the image forming apparatus structured as described above, the upper and lower hinge frames are each formed by bending sheet metal into a square-cornered U shape. With this structure, it is possible to change the mode of rotation simply by replacing the hinge frames that are obtained through sheet-metal processing; thus, it is also possible to reduce component costs incurred in changing the mode of rotation according to the size and the function of the apparatus.

Further, according to the present invention, in the image forming apparatus structured as described above, engagement portions formed in the upper and lower hinge frames engage with each other and thereby regulate the rotation range of the second holding member. With this structure, it is possible to surely regulate the rotation stop position of the upper and lower hinge frames forming the second holding member.

Further, according to the present invention, the image forming apparatus structured as described above further includes: a document conveying section arranged on top of the document stage so as to convey the document; and a hinge portion coupling the document conveying section rotatably relative to the image reading section, wherein the hinge portion and the second holding member are mounted on the same side of the body frame, and the document conveying section is rotated in the same direction as the image reading section. With this structure, it is possible to perform maintenance work from the side for daily use of the apparatus, thus leading to efficient use of installation space.

Further, according to the present invention, in the image forming apparatus structured as described above, the body frame is rectangular as seen in a plan view, and the second holding member is arranged at a rear-side portion of the body frame, the first holding member being arranged in front of the second holding member, the first holding member comprising a first holding part arranged closer to the rear-side portion in front of the second holding member and a second holding part arranged closer to a front side. With this structure, when the image reading section is rotated, no interference occurs between the first and second holding members; thus, it is possible to perform the rotation operation satisfactorily.

Further, according to the present invention, in the image forming apparatus structured as described above, as the image reading section is rotated from the closed state to the open state, the first fulcrum portion moves downward so as to make contact with a guide shaft and thereby form a hinge-fulcrum shaft and a hinge-fulcrum hole that serve as a center of rotation around which to allow rotation. With this structure, at an initial stage of rotation from the closed state to the open state, the center of rotation is not formed, and accordingly, the hinge portion receives no load. Moreover, after the first fulcrum portion of the guide slot comes into contact with the guide shaft, the guide shaft and the guide slot become a hinge-fulcrum shaft and a hinge-fulcrum hole, respectively, making it possible to facilitate the rotation operation thereafter.

DETAILED DESCRIPTION OF PREFERRED EMBODIMENTS

Figure 1:
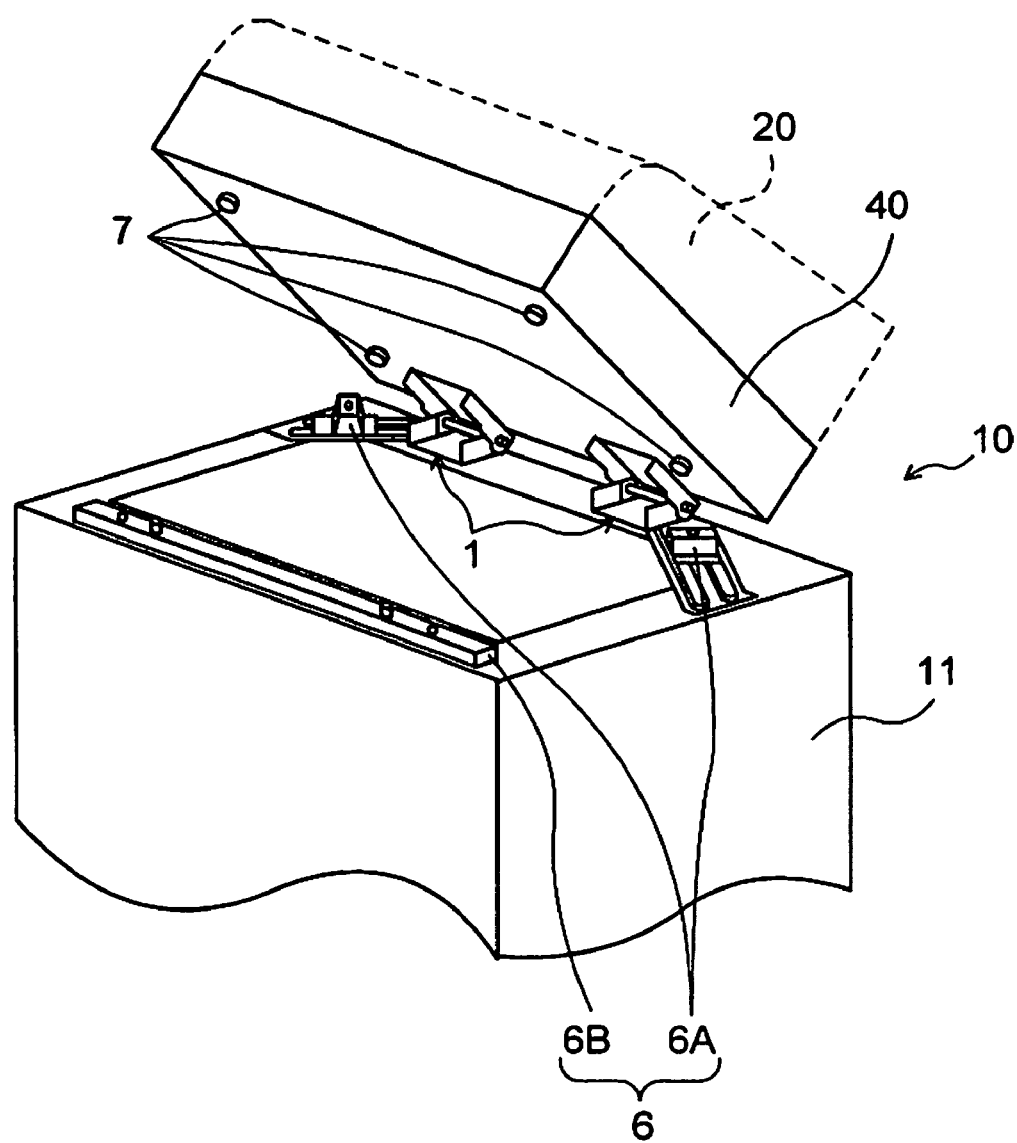
FIG. 1 is a schematic perspective view showing an open state of an image forming apparatus including second holding member of the present invention.

Hereinafter, an embodiment of the present invention will be described with reference to the accompanying drawings. Any structure, arrangement, and other features described in connection with this embodiment are illustrative only and are not meant to limit the scope of the invention. Throughout the description, the same constituent members are assigned the same reference numerals and symbols, and no detailed description thereof will be repeated unless necessary.

Figure 4:
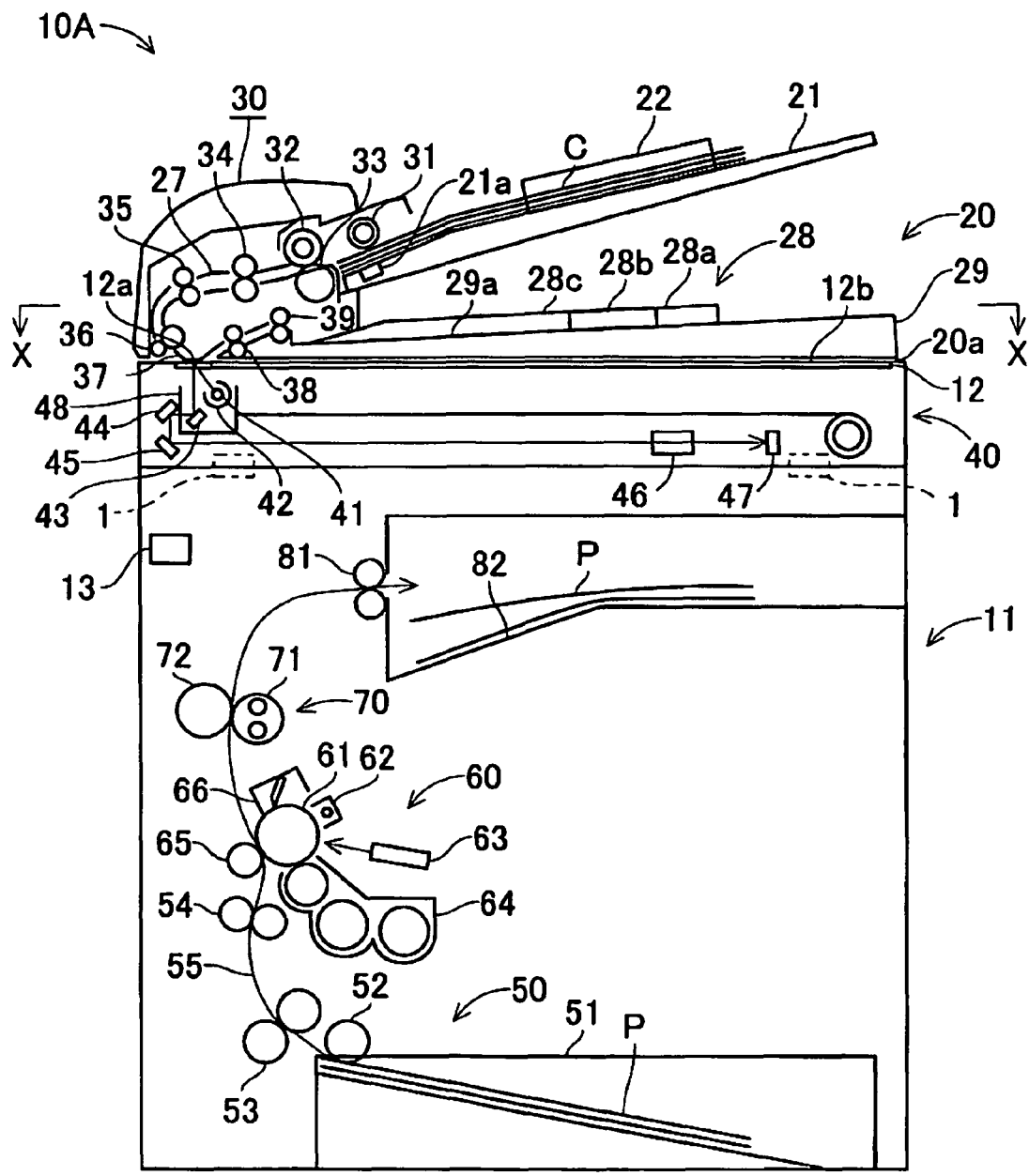
FIG. 4 is a schematic explanatory view showing a configuration of an image forming apparatus.

As shown in FIG. 1, an image forming apparatus 10 according to the present invention includes, like the conventional exemplary image forming apparatus 10A, an upper member, such as an image reading section 40, arranged on a body frame 11 incorporating, for example, an image forming section. The image reading section 40 is mounted on the body frame 11 via two holding members, namely a first holding member 6 and a second holding member 1. The first holding member 6 is a coupling member for placing the image reading section 40 at a predetermined position on the body frame 11. The second holding member 1 is for holding the upper member openably with respect to the body frame 11 and is disposed, for example, at the position indicated by imaginary lines in FIG. 4.

The first holding member 6 is so arranged that the image reading section 40 is fixed on the body frame 11 at three sides thereof except for the one side at which the second holding member 1 is attached. For example, if it is assumed that where the second holding member 1 is provided is a rear-side portion, the first holding member 6 is composed of first holding parts 6A having stages, respectively, on which two lateral-side portions are placed, and a second holding part 6B having a stage on which a front-side portion is placed. In addition, elastic pieces 7 of rubber, which will be described later, make contact with those stages, and the holding parts may each be furnished with a guide member for positioning and a fixing member such as a screw.

Preferably, the second holding member 1 is so structured that when the image reading section 40 is held on the body frame 11 via the first holding member 6, the second holding member 1 is in a no-load state, in which it receives no load, and that when the image reading section 40 is released from the state held by the first holding member 6 and is so rotated relative to the body frame 11 as to be opened, the second holding member 1 engages and goes into a loaded state, in which it functions as a hinge. To that end, the second holding member 1 includes a guide shaft 4 and elongated hole-shaped guide slots 5 slidably holding the guide shaft 4. The guide shaft 4 and the guide slots 5 are so arranged as to assume either an engaged or disengaged state at a time, and in the engaged state, the guide slots 5 hold the guide shaft 4 so as to function as a hinge.

Elongated hole-shaped, the guide slots 5 are each composed of arc-shaped portions at opposite ends and a middle slot portion, and therefore permit the guide shaft 4 to assume either a state in which the guide shaft 4 is and remains in contact with one of the arc-shaped end portions or a state in which the guide shaft 4 is apart from either of the end portions and is moving in the middle slot portion. The no-load state in which the second holding member 1 including the guide shaft 4 and the guide slots 5 receives no load refers to a state in which the image reading section 40 is held via the first holding member 6 and in which the guide shaft 4 is located in the middle slot portions of the guide slots 5. Accordingly, this state is referred to as a disengaged state, whereas the state in which as a result of the image reading section 40 being released from the state held by the first holding member 6 and rotated relative to the body frame 11 so as to be opened, the guide shaft 4 and the guide slots 5 receive load so as to function as a hinge is referred to as an engaged state.

With this structure, when the image reading section 40 is placed at a predetermined position on the apparatus body, the guide shaft 4 and the guide slots 5 can be brought into the disengaged state so as not to function as a hinge; on the other hand, when the image reading section 40 is lifted up so as to be rotated, the guide shaft 4 and the guide slots 5 can be brought into the engaged state. Accordingly, when the image reading section 40 is placed, the image reading section 40 can be mounted on and held via the first holding member 6, and via the aforementioned guide member for positioning and the fixing member such as a screw, in a no-load state, in which the hinge portion receives no load. In this manner, while the first holding member 6 is enabled, the second holding member 1 is not enabled, so that the first and second holding members 6 and 1 do not interfere with each other and the image reading section 40 is set via the first holding member 6 alone; thus, it is possible to place the image reading section 40 at a precise position.

On the other hand, when the first holding member 6 is released and the image reading section 40 is lifted up so as to be rotated, the guide shaft 4 and the guide slots 5 engage with each other so as to form a hinge-fulcrum shaft and hinge-fulcrum holes, which serve as the center of rotation. Consequently, while the first holding member 6 is not enabled, the second holding member 1 is enabled, facilitating rotation operation. Therefore, the second holding member 1 of this embodiment provides such coupling as to function as a hinge in conjunction with rotation operation.

Further, when the image reading section 40 is placed, the second holding member 1 is in a no-load state; therefore, it is possible to avoid deformation of the hinge portion. Even if the hinge portion is deformed, it does not affect the placement of the image reading section 40. Accordingly, even when the image reading section 40 is opened and closed repeatedly, no change occurs in the coupled posture via the hinge-like coupling portion or in the relative position of the image reading section 40.

Further, the guide shaft 4 is slidably put through the elongated hole-shaped guide slots 5 that are disposed at opposite ends of the shaft so as to face each other. With this structure, when an upper member such as the image reading section 40 is rotated, the guide shaft 4 does not come out of the guide slots 5; thus, it is possible to rotate the upper member such as the image reading section 40 safely. The position and range of rotation in which the second holding member 1 functions as a hinge depend on the state of engagement of the guide shaft 4 and the guide slots 5. Next, this state will be discussed with reference to FIGS. 2 and 3.

Figure 2:
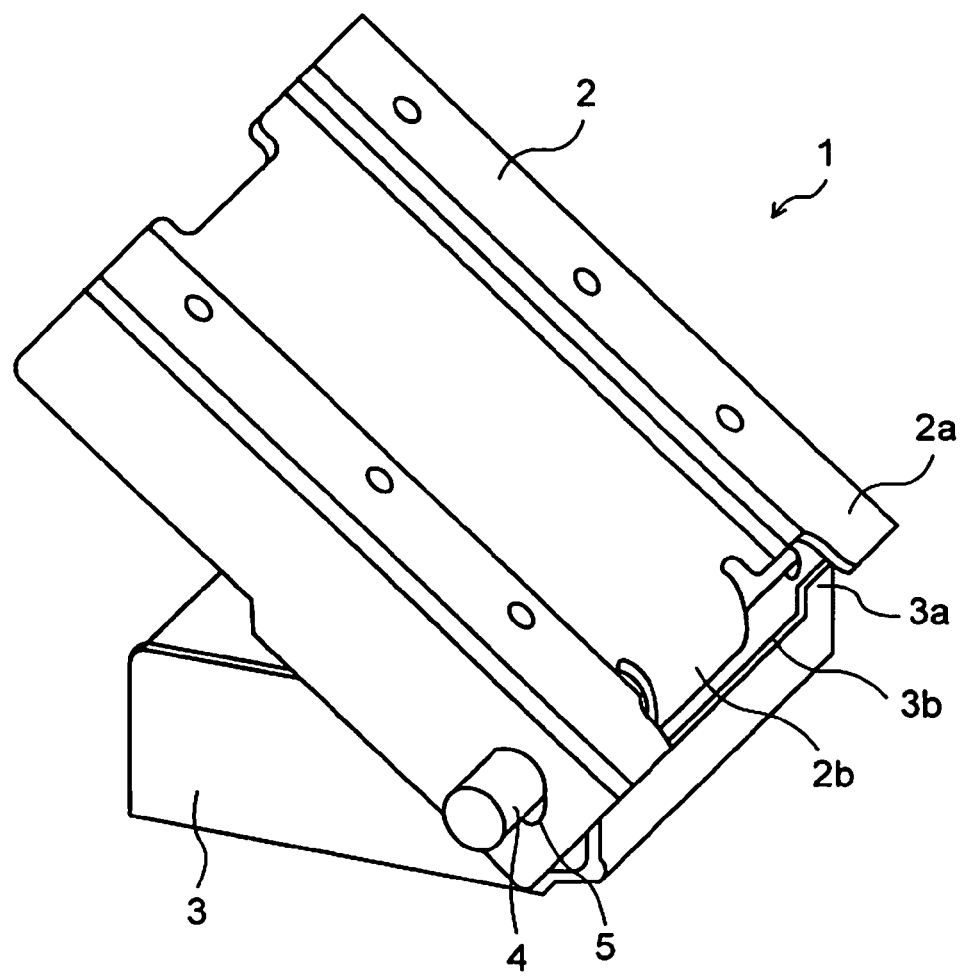
FIG. 2 is an enlarged perspective view showing the second holding member.

As shown in FIG. 2, the second holding member 1 includes an upper hinge frame 2 and a lower hinge frame 3, and these two frames are coupled at one end thereof via the guide shaft 4. As described earlier, the elongated hole-shaped guide slots 5 are formed through which the guide shaft 4 is slidably put, and in addition the first holding member 6 is employed that holds the image reading section 40 at a predetermined position. Thus, it is possible to keep the guide shaft 4 and the guide slots 5 in either the engaged or disengaged state at a time. The guide shaft 4 and the guide slots 5 are provided either such that the former is on the upper hinge frame and the latter in the lower hinge frame or vice versa.

Here, this embodiment will deal with a case where the guide slots 5 are provided in the upper hinge frame 2, and the guide shaft 4 is provided on the lower hinge frame 3. For this, for example, both the hinge frames are formed by bending sheet metal into a square-cornered U shape, so that the guide slots 5 can be formed in, and the guide shaft 4 can be arranged on, opposite side faces that are formed as a result of the bending. With this structure, the guide shaft 4 is disposed in such a manner as to couple together the opposite side faces of the lower hinge frame 3 on the fixed side; thus, while the image reading section is being rotated, the guide shaft 4 does not come out of the guide slots 5, and the image reading section can therefore be opened and closed safely. Moreover, it is possible to change the mode of rotation simply by replacing the upper hinge frame 2 provided with the guide slots 5 on the movable side. Thus, it is possible to change the mode of rotation simply by replacing the hinge frames that are obtained through sheet-metal processing alone, leading to reduced component costs.

Figure 3A:
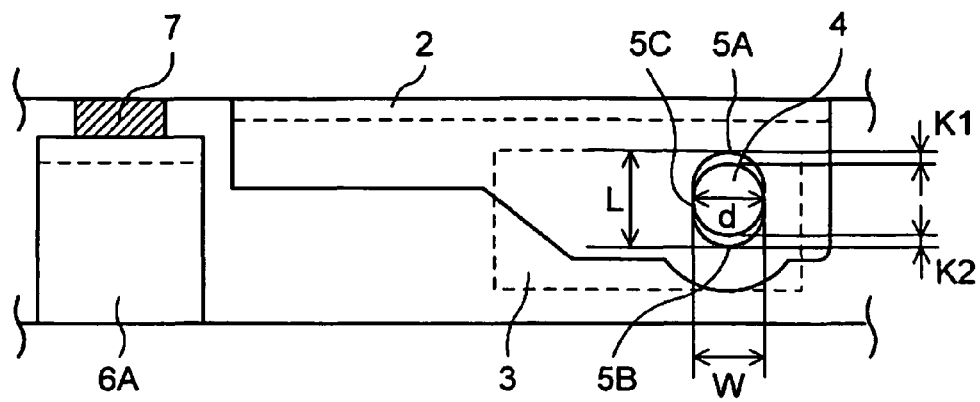
FIGS. 3A and 3B are side views of the second holding member showing a closed state and an open state, respectively.

Further, in this embodiment, as shown in FIG. 3A, when the second holding member 1 is in a closed state, the guide shaft 4 is not in contact with either of the arc-shaped portions at the ends of the guide slots 5 but is located in the middle slot portion. In this state, as described earlier, the first holding member 6 receives the load of the image reading section 40, and the second holding member 1 is in the no-load state. From this closed state, as the upper hinge frame 2 is rotated and opened, the guide shaft 4 is brought into contact with one of the arc-shaped portions at the ends of the guide slots 5, and while maintaining this state, the hinge frame 2 continues to rotate. Therefore, the arc-shaped portions at the ends of the guide slots 5 are referred to as a first and a second fulcrum portions, respectively, whereas the middle slot portion is referred to as a slide guide portion, because it serves as a guide that guides the sliding movement of the guide shaft 4.

Figure 3B:
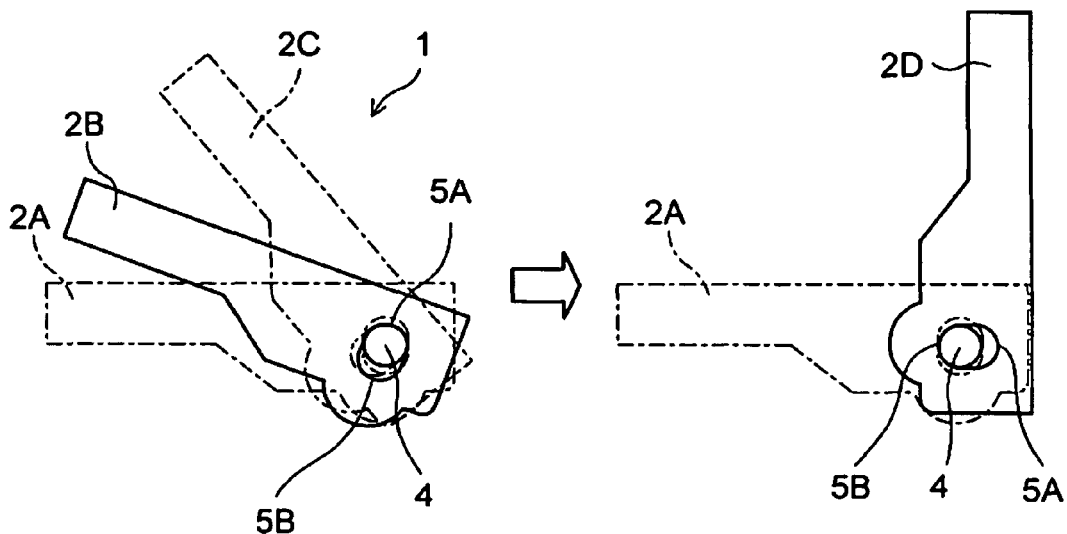

More specifically, the guide slots 5 are elongated hole-shaped with a width W and a length L and are each composed of a first fulcrum portion 5A, a second fulcrum portion 5B, and a slide guide portion 5C. The width W is slightly larger than the radius d of the guide shaft 4 so that the guide shaft 4 is slidable. The length L is a few (e.g., one to three) millimeters longer than the radius d of the guide shaft 4. In the closed state shown in FIG. 3A, the guide shaft 4 is located in the slide guide portion 5C at a distance K1 from the first fulcrum portion 5A and at a distance K2 from the second fulcrum portion 5B. As the guide shaft 4 is rotated from this closed state, its position changes as shown in FIG. 3B.

In the closed state, the image reading section 40 rests on the aforementioned holding parts 6A. Here, the elastic pieces 7 of rubber are arranged at positions on the image reading section 40 where contact is made with the tops of the first holding parts 6A, so that the elastic pieces 7 make contact with the tops of the first holding parts 6A to serve as a shock absorber and a vibration damper. From the closed state, the fixed state by the first holding member 6 is released, and the upper member such as the image reading section 40 is rotated relative to the body frame 11. More specifically, when the upper member is slightly lifted up from the closed state 2A and is rotated up to an open position 2B, the position at which the first holding parts 6A and the elastic pieces 7 are in contact with each other becomes the center of rotation, and the aforementioned first fulcrum portion 5A swings downward so as to make contact with the guide shaft 4. Thereafter, since the guide shaft 4 serves as a hinge fulcrum shaft so as to allow rotation, the second holding member 1 starts to function as a hinge, making it possible to facilitate the subsequent rotation operation.

It is obvious that the rotation position at which the first fulcrum portion 5A comes into contact with the guide shaft 4 depends on the distance K1. By changing this distance K1, the rotation position at which the second holding member 1 starts to function as a hinge can be varied. After the first fulcrum portion 5A and the guide shaft 4 come into contact with each other, the second holding member 1 acts as a hinge member and rotates while maintaining the contact between the first fulcrum portion 5A and the guide shaft 4. That is, the first fulcrum portion 5A serves as a hinge fulcrum hole, and the guide shafts 4 serves as a hinge fulcrum shaft.

When the first holding member 1 is further rotated and reaches a rotation position 2C, the center of gravity of the upper member starts to move backward from the guide shaft 4 serving as a fulcrum. As a result, the contact between the first fulcrum portion 5A and the guide shaft 4 is released. In the subsequent rotation, the slide guide portion 5C guides the guide shaft 4 until when the aforementioned second fulcrum portion 5B comes into contact with the guide shaft 4. After further rotation from the rotation position 2C, the second fulcrum portion 5B comes into contact with the guide shaft 4 at a rotation position 2D.

As described above, the first fulcrum portion 5A defines a rotation position at which the hinge function starts when the upper member such as the image reading section 40 is rotated from the closed state to the open state, and the second fulcrum portion 5B defines a hinge position when the rotation exceeds a predetermined angle. To stop the rotation, to regulate the rotation angle of the upper and lower hinge frames is enough. For example, the rotation can be stopped by engaging an engagement portion 2a (see FIG. 2) formed in the upper hinge frame 2 with an engagement portion 3a formed in the lower hinge frame 3. At this stop position, the center of gravity of the rotating upper member moves backward from the guide shaft 4 as a fulcrum, and thereby it is possible to keep this open state by use of the weight of the upper member itself without use of any other fixing member. Also, it is possible to stop the rotation at any position within the rotation range via a stop position fixing member such as a bonnet stay.

A cover portion 2b is formed by bending part of the upper hinge frame 2 so as to fit the circumference of the guide shaft 4, and the lower hinge frame 3 is provided with a cut-out portion 3b for avoiding interference with the cover portion 2b. Accordingly, even when the upper member is rotated and thereby the upper hinge frame 2 is opened, the cover portion 2b does not interfere with the lower hinge frame 3; therefore, the rotation is stopped via a stop position fixing member separately provided or by the engagement portion 2a engaging with an engagement portion 3a formed in the lower hinge frame 3.

With this structure, when the image reading section 40 is placed over the image forming section fixedly housed inside the body frame 11, since no force acts on the second holding member 1 that functions as a hinge, it is possible to accomplish precise positioning without relying on the hinge portion. For maintenance work, with the image reading section 40 lifted up and rotated, the second holding member 1 starts to function as a hinge by use of the weight of the rotated member itself; thus, the rotation is facilitated thereby. In addition, the rotation angle available is so large as to facilitate maintenance work.

Further, the body frame 11 is rectangular as seen in a plan view; the second holding member 1 is disposed at the rear-side portion of the body frame; the first holding member 6 is arranged in front of the second holding member 1; the first holding includes the first holding part 6A arranged closer to the rear-side portion in front of the second holding member 1 and the second holding part 6B arranged closer to the front side. Consequently, the second holding member 1 is located behind the first holding member 6. Therefore, in the rotation operation in which the image reading section 40 is lifted up, these holding members do not interfere with each other; thus, it is possible to perform the rotation operation of the image reading section 40 satisfactorily.

As the second holding member 1, the guide shaft 4 may also be provided on the upper hinge frame 2, and the guide slots 5 may also be provided in the lower hinge frame 3. In this arrangement too, the guide slots 5 are each composed of arc-shaped portions at opposite ends and a middle slot portion; thus, one of the end portions becomes a fulcrum, and the middle slot portion serves as a slide guide portion that guides the guide shaft 4 to move from the closed state to the open state. Moreover, in the closed state, the guide shaft 4 is in the disengaged state where it is located in the slide guide portion. The guide shaft 4 and the guide slots 5 thus disengaged from each other in the closed state are put in the engaged state during the rotation operation and in the open state, so that they function as a hinge over the entire range of the rotation operation. Accordingly, it is possible to open and close the image reading section 40 safely.

On top of the image reading section 40 included in the image forming apparatus 10, there are provided a document stage (e.g., the platen 12) on which a document is loaded and the document conveying section 20 arranged on top of the document stage to convey that document. To permit a document to be loaded on the document stage, the document conveying section 20 is coupled with the image reading section 40 via another hinge portion so as to be rotatable relative to the image reading section 40. Accordingly, the image forming apparatus 10 provided with the second holding member 1 has two stages of, i.e., upper and lower, hinge portions. These hinge portions may be arranged on different side faces or may be arranged at an upper and a lower positions on the same side face. In this embodiment, the hinge portion mounted in the document conveying section 20 and the second holding member 1 are mounted on the same side of the body frame, so that the document conveying section and the image reading section are rotatable in the same direction.

With this structure, it is possible to perform maintenance work from the side for daily use of the apparatus, thus leading to efficient use of installation space. In a case where the operation position for maintenance work is different from that for daily use, it is possible to arrange the second holding member 1 in a direction suitable for maintenance work. In any case, when the image reading section 40 is rotated via the second holding member 1, it is desirable that the document conveying section 20 be fixed on the image reading section 40 or be removed therefrom in advance.

The preferred embodiment of the present invention specifically described above is not meant to limit the scope of the invention, and various changes and modifications can be made in practicing the present invention without departing from the spirit of the invention.

As described above, according to the present invention, in the image forming apparatus including the image reading section over the image forming section, as holding members holding the image reading section, two holding members are interposed between the image reading section and the image forming section, that is, first holding member that holds the image reading section at a precise position on top of the image forming section and second holding member that holds the image reading section openably with respect to the image forming section, and moreover the second holding member engages in conjunction with the rotation operation of the image reading section so that the second holding member functions as a hinge. With this structure, it is possible to facilitate the positioning of the image reading section relative to the image forming section and to obtain the image forming apparatus in which the image reading section is easily rotatable relative to the image forming section.

Further, so that while the first holding member is enabled, the second holding member may not be enabled, and while the second holding member is enabled, the first holding member may not be enabled, the first and second holding member do not interfere with each other. Thus, it is possible to surely maintain the closed state and to perform the rotation operation in the open state without causing the interference between the two holding members.

Accordingly, the present invention is preferably applicable to image forming apparatuses like those of the type having the image reading section openably disposed over the image forming section, in which both upper and lower members requiring precise positioning are opened and closed as necessary.

Further, for maintenance work, it is possible to widely rotate the image reading section; thus, according to the present invention, it is possible to provide an image forming apparatus in which even when the image reading section is opened and closed repeatedly, no change occurs in a relative position of the image reading section. Accordingly, the present invention is applicable to an image forming apparatus provided with an image forming section and an image reading section, which is not opened/closed in daily use but is opened/closed for replacement of internal components or for maintenance work.

What is claimed is:

1. An image forming apparatus comprising:
a body frame;
an image forming section provided in the body frame;
an image reading section for reading a document loaded on a document stage;
a first holding member attached on the body frame, for mounting and holding the image reading section on the body frame in a closed state; and
a second holding member attached on the body frame, for holding the image reading section rotatably relative to the body frame in an open state; wherein
the second holding member includes a guide shaft and a guide slot,
the guide shaft and the guide slot being in a disengaged state when the image reading section is in the closed state,
the guide shaft and the guide slot being in a state engaged with each other so as to function as a hinge when the image reading section is rotated, from the closed state to the open state, relative to the body frame.

2. The image forming apparatus of claim 1, wherein the first and second holding members are configured not to interfere with each other so that while the first holding member is enabled, the second holding member is not enabled, and while the second holding member is enabled, the first holding member is not enabled.

3. The image forming apparatus of claim 1, wherein the second holding member includes an upper hinge frame acting as a movable side and a lower hinge frame acting as a fixed side, the guide shaft is provided on one of the hinge frames, and the guide slot is provided in another of the hinge frames, and the guide slot is elongated-hole shaped so as to slidably hold the guide shaft and two of such guide slots are disposed at opposite ends of the guide shaft so as to face each other.

4. The image forming apparatus of claim 3, wherein the guide slots are provided in the upper hinge frame, and the guide shaft is provided on the lower hinge frame.

5. The image forming apparatus of claim 4, wherein the guide slot has arc-shaped end portions and a middle slot portion, wherein
one of the end portions becomes a first fulcrum portion at which the guide shaft and the guide slot engage with each other in rotation from the closed state to the open state,
another of the end portions becomes a second fulcrum portion at which the guide shaft and the guide slot engage with each other when the rotation reaches a point beyond a predetermined angle, and
the middle slot portion serves as a slide guide portion that guides the guide shaft to move between the first and second fulcrum portions, and the guide shaft is located in the slide guide portion to be in the disengaged state when the image reading section is in the closed state.

6. The image forming apparatus of claim 3, wherein the guide shaft is provided on the upper hinge frame, and the guide slots are provided in the lower hinge frame.

7. The image forming apparatus of claim 6, wherein the guide slot has arc-shaped end portions and a middle slot portion, wherein
one of the end portions becomes a fulcrum portion in the open state, and
the middle slot portion serves as a slide guide portion that guides the guide shaft to move for rotation from the closed state to the open state, and the guide shaft is located in the slide guide portion to be in the disengaged state when the image reading section is in the closed state.

8. The image forming apparatus of claim 3, wherein the upper and lower hinge frames are each formed by bending sheet metal into a square-cornered U shape.

9. The image forming apparatus of claim 3, wherein engagement portions formed in the upper and lower hinge frames engage with each other and thereby regulate a rotation range of the second holding member.

10. The image forming apparatus of claim 1, further comprising:
a document conveying section arranged on top of the document stage so as to convey the document; and
a hinge portion coupling the document conveying section rotatably relative to the image reading section,
wherein
the hinge portion and the second holding member are mounted on a same side of the body frame, and
the document conveying section is rotated in a same direction as the image reading section.

11. The image forming apparatus of claim 1, wherein the body frame is rectangular as seen in a plan view, and the second holding member is arranged at a rear-side portion of the body frame, the first holding member being arranged in front of the second holding member, the first holding member comprising a first holding part arranged closer to the rear-side portion in front of the second holding member and a second holding part arranged closer to a front side.

12. The image forming apparatus of claim 5, wherein the body frame is rectangular as seen in a plan view, and the second holding member is arranged at a rear-side portion thereof, the first holding member being arranged in front of the second holding member, the first holding member comprising a first holding part arranged closer to the rear-side portion in front of the second holding member and a second holding part arranged closer to a front side.

13. The image forming apparatus of claim 12, wherein as the image reading section is rotated from the closed state to the open state, the first fulcrum portion moves downward so as to make contact with a guide shaft and thereby form a hinge-fulcrum shaft and a hinge-fulcrum hole that serve as a center of rotation around which to allow rotation.

* * * * *